United States Patent [19]
El Dorado

[11] 3,926,104
[45] Dec. 16, 1975

[54] INDUSTRIAL SAFETY APPARATUS FOR DISPOSING OF WELDING FUMES

[75] Inventor: James H. El Dorado, Minneapolis, Minn.

[73] Assignee: Midwest Mechanical Services, Inc., Minneapolis, Minn.

[22] Filed: June 24, 1974

[21] Appl. No.: 482,201

[52] U.S. Cl. ............... 98/115 VM; 55/101; 55/385; 266/15
[51] Int. Cl.² ......................................... F23J 11/00
[58] Field of Search ............ 55/101, 124, 126, 128, 55/139, 383, 418, 470–473, 356, 357, 385; 98/115, 115 VM; 266/15

[56] References Cited
UNITED STATES PATENTS

| | | | |
|---|---|---|---|
| 2,829,582 | 4/1958 | Abbott et al. | 98/115 SB |
| 3,380,371 | 4/1968 | Scheel | 266/15 |
| 3,385,036 | 5/1968 | Webb | 55/418 |
| 3,618,509 | 11/1971 | Nichols | 98/115 K |
| 3,747,301 | 7/1973 | Glover et al. | 55/139 |

FOREIGN PATENTS OR APPLICATIONS

| | | | |
|---|---|---|---|
| 794,442 | 12/1935 | France | 55/124 |

*Primary Examiner*—Bernard Nozick
*Attorney, Agent, or Firm*—Merchant, Gould, Smith, Edell, Welter & Schmidt

[57] ABSTRACT

Industrial safety apparatus for maintaining the quality of air in welding shops, and including a hood for positioning over a workpiece to be welded, an air purifier, and means drawing shop air over the workpiece into the hood and through the purifier and discharging it back into the shop. One embodiment of the invention combines the above elements with a vehicle carrying the welding equipment for ready portability of the assembly to work anywhere in the shop.

1 Claim, 5 Drawing Figures

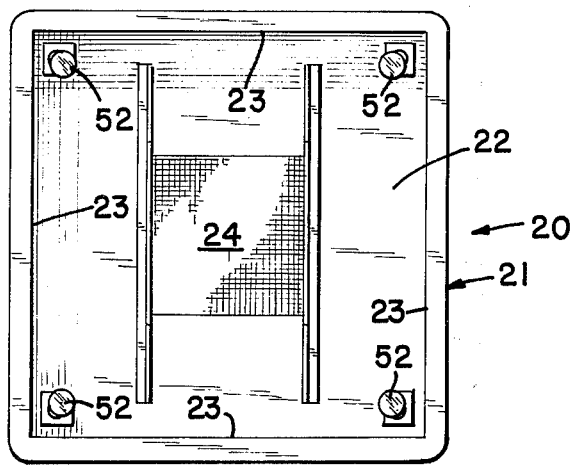
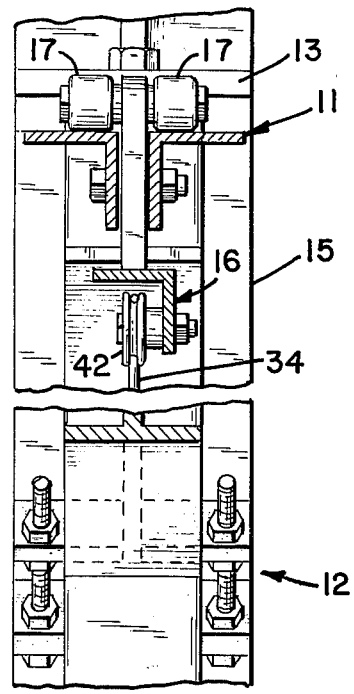
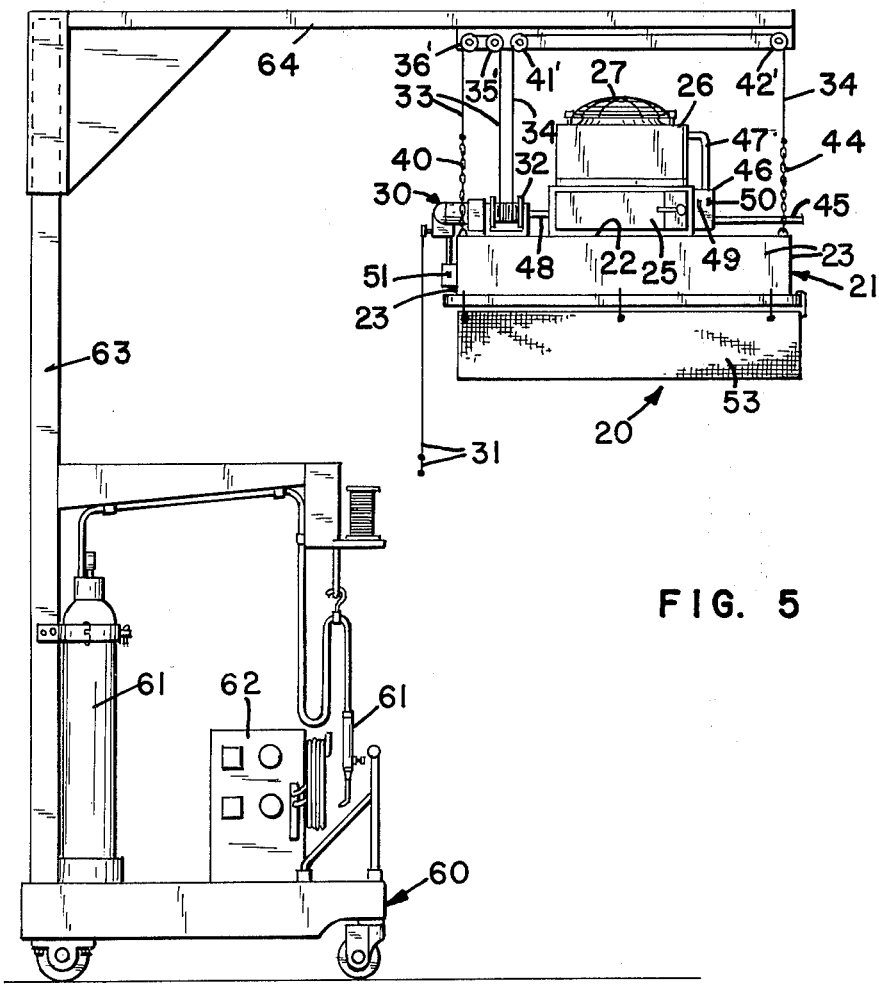

INDUSTRIAL SAFETY APPARATUS FOR DISPOSING OF WELDING FUMES

BACKGROUND OF THE INVENTION

This invention relates to the field of industrial safety, and particularly to the maintenance of adequate air quality in welding shops and similar environments.

It is well known that welding processes, electric arc welding in particular, produce noxious pollutants in the air of the welding shop, particularly when galvanized iron is to be welded. Small concentrations of these pollutants may be tolerated, but concentrations of appreciable magnitude constitute a recognized health hazard for workmen in the welding trade. One attempt to remedy this situation comprises ventilating the entire shop: this has the first disadvantage of requiring an enormous ventilating equipment with enormous power requirements; the second disadvantage of transmitting the pollutants into the general outside atmosphere; and the third disadvantage of conducting the warmthh of the shop to the outside as well as the pollutants, thus greatly increasing the demand for heating energy in the cold weather.

A second attempt to remedy the situation divides the shop into bays or partially enclosed work areas, each vented to the outside. The same disadvantages apply here, on an only slightly smaller scale, and the additional problem arises of how to work on pieces larger than a work bay.

Another factor must be taken into consideration, and this is that welding shops must be served by cranes, which means that the design and installation of suitable duct work for the conduction and discharge of the fumes is often difficult and sometimes impossible because craneways cannot be blocked.

SUMMARY OF THE INVENTION

My invention solves the problems listed above by a single and simple new concept, that of removing the pollutant without discharging the shop air outside the shop. The noxious material is particulate in nature, and I have found that an electrostatic air cleaner is capable of removing it from air as the air passes through the cleaner. My invention, therefore, collects polluted air from near the source of pollution, passes it through an appropriate purifier, and discharges it within the same general shop area. By this the expense and energy loss inherent in general ventilation is avoided, the need for duct work is obviated, and substantially all limitation on the size and location of workpieces is removed. Indeed, one embodiment of my invention is specifically designed to go to the work rather than having the work brought to the equipment.

It is accordingly a principal object of my invention to provide a new and improved industrial safety arrangement for maintaining the quality of air in welding shops.

Another object of this invention is to provide means for maintaining the quality of air in welding shops without introducing excess demands for investment funds, operating energy, and heat loss replacement.

A more specific object of the invention is to provide air purifying equipment for use in welding shops and allied locations by which the air is purified and returned to the shop area rather than being discharged outside.

A still more specific object of the invention is to provide apparatus as described above including a hood to be suspended over a workpiece, an electrostatic air cleaner, and means for drawing shop air from over the workpiece into the hood and through the cleaner, discharging it into the shop free from particulate pollutants.

Various other objects, advantages, and features of novelty which characterize my invention are pointed out with particularity in the claims annexed hereto and forming a part hereof. However, for a better understanding of the invention, its advantages, and objects attained by its use, reference should be had to the drawings which form a further part hereof, and to the accompanying descriptive matter, in which there are illustrated and described certain preferred embodiments of the invention.

Figure 1:
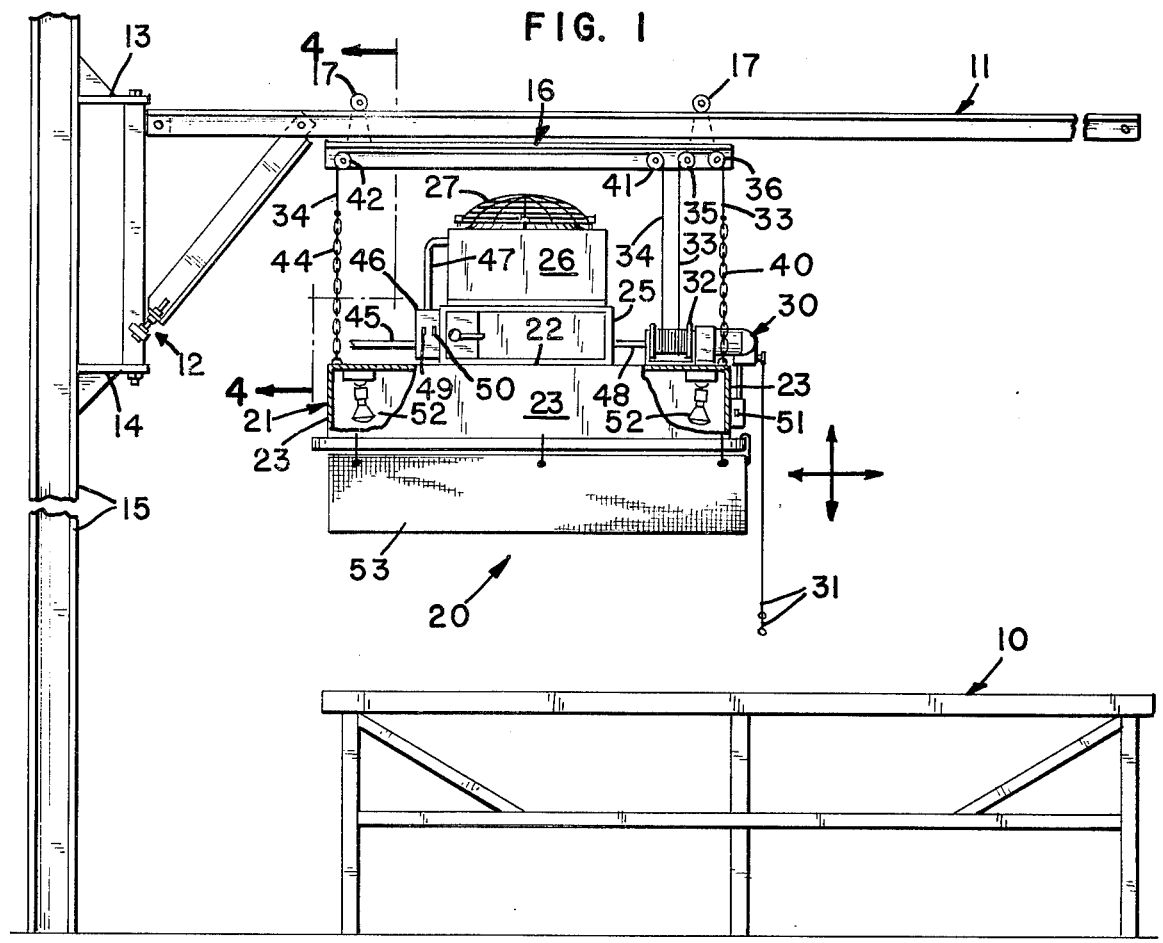
FIG. 1 is a view in elevation of my invention installed in a welding shop, parts being broken away.
Figure 2:
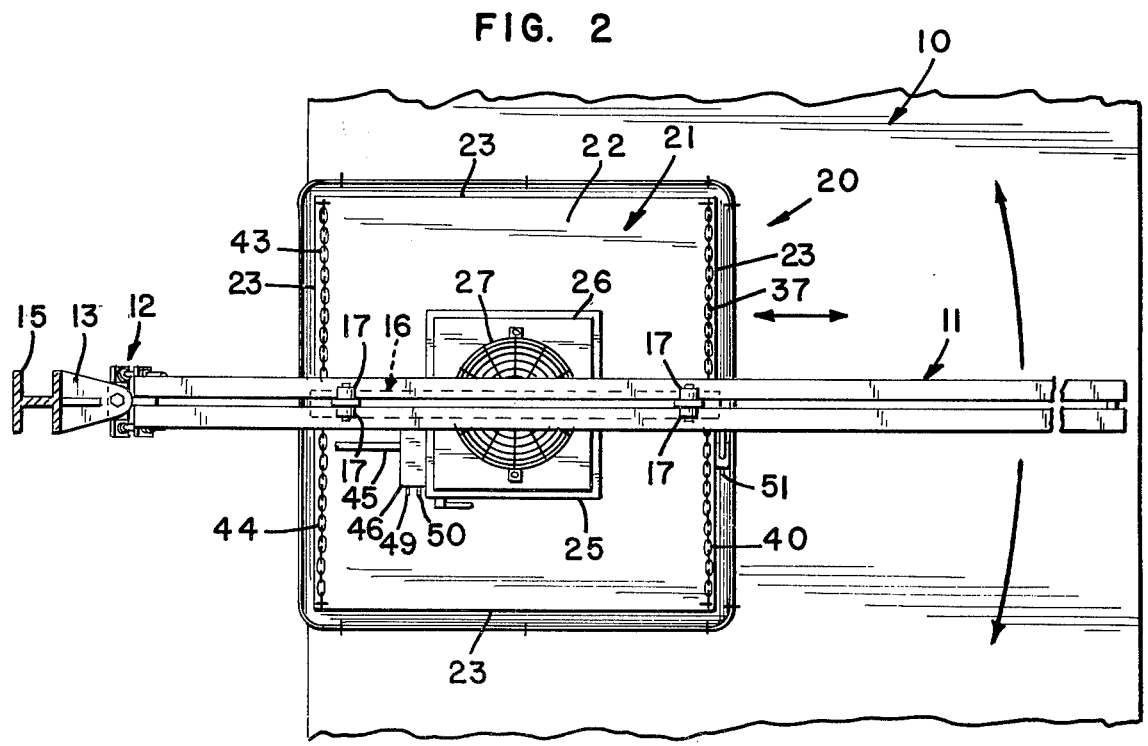
FIG. 2 is a plan view of the apparatus of FIG. 1.

FIG., 3 is a bottom view of a portion of FIG. 1;

FIG. 4 is a sectional view taken along the line 4—4 of FIG. 1; and

FIG. 5 shows a modification of the invention.

DESCRIPTION OF THE PREFERRED EMBODIMENTS

Turning now to the drawings, my invention is shown in FIGS. 1–4 as installed in a welding shop having a large work table 10 to support pieces being welded. A boom 11 having a leveling adjustment 12 is pivotally supported in brackets 13 and 14 secured to a suitable column 15. Boom 11 acts as a track for a carriage 16 which is laterally displaceable along the track on rollers 17. Suspended below carrier 16 is my air treatment unit 20, which is shown to comprise a hood 21 having a base 22 and downwardly projecting walls 23. The center of base 22 is cut out and covered by a suitable screen 24, and an electrostatic air cleaner 25 is mounted with its inlet over the cutout. A fan, blower, or other suitable air moving device 26 is mounted on the outlet of the air cleaner, and a grill 27 protects the fan outlet.

An electric winch 30 is mounted on base 22 for control by the pull cords 31 to move in either direction or to remain locked. Secured to the drum 32 of winch 30 are a pair of cables 33 and 34. Cable 33 passes over pulleys 35 and 36 on carriage 16 and is connected to the upper ends of chains 37 and 40 fastened to first and second corners of base 22. Cable 34 passes over pulleys 41 and 42 on carriage 16 and is connected to third and fourth corners of base 22 by chains 43 and 44. Thus, when winch 30 is caused to operate in one direction or the other, the unit 20 is raised or lowered as cables 33 and 34 are wound on or off of drum 32.

Electrical energy is supplied to unit 20 by a flexible cable 45 connected to a junction box 46 from which it goes directly to air cleaner 25 and through conduits 47 and 48 to fan 26 and winch 30. Cutoff switches for members 25, 26 and 30 are shown at 49, 50 and 51 respectively. Cable 45 is connected to a suitable main switch not shown.

Much of the illumination for welding shops comes from overhead, either from skylights or from artificial light fixtures. This illumination is cut off by my unit 20 and accordingly, I mount additional lights 52 under base 22. I also provide a flexible skirt 53 of flame resistant material which depends from the walls of hood 21 to further control the movement of air.

In use, my carriage 16 is manually displaced along boom 11, and the boom is pivoted in brackets 13, 14 to clear the work table 10 and the workpieces to be welded are placed on the table manually or by suitable cranes. Unit 20 is now centered over the area to be welded, electrical energy is supplied on cable 45, and the unit is lowered until only comfortable working space remains above the workman. The welder now does his work in a well-lighted area, any noxious fumes from the welding being drawn into the hood and through the air cleaner where the particulate matter is removed, the clean air being discharged into the shop through grill 27.

FIG. 5 shows a modification of my invention which is adapted to be taken to large pieces not readily positioned on a work bench such as 10. In that Figure a wheeled vehicle 60 is shown as carrying gas welding equipment 61 and electric welding equipment 62. Vehicle 60 is further provided with a mast 63 to which a boom 64 is fixedly secured. Pulleys 35', 36' and 41' and 42' are pivotally fixed to boom 64, and support unit 20. For this embodiment of the invention there is no advantage in pivoting the boom or suspending the unit from a movable carriage.

Numerous objects and advantages of my invention have been set forth in the foregoing description, together with details of the structure and function of the invention, and the novel features thereof are pointed out in the appended claims. This disclosure, however, is illustrative only, and changes may be made in detail, especially in matters of shape, size, and arrangement of parts, within the principle of the invention, to the full extent indicated by the broad general meaning of the terms in which the appended claims are expressed.

What is claimed is:

1. Self-contained industrial safety apparatus for use to maintain the quality of air in welding shop while conserving the energy required to heat the shop and protecting the air ambient to the shop from pollution, comprising, in combination:

a rigid hood having a closed top with an outlet and surrounding edges depending therefrom;

movable means including a wheeled vehicle for positioning said hood over a work piece to be welded;

connecting means including a winch carried by said hood and pulleys carried by said vehicle for actuation to vary the height of said hood to accomodate work pieces of different heights;

a flexible skirt of flame resistant material depending from the lower edges of said hood to define a working volume of shop space beneath which welding operations releasing atmospheric pollutents may be performed;

illumination means carried by said hood within said hood for providing working illumination within said volume to replace normal illumination cut off by said hood;

an electrostatic air cleaner mounted in said outlet in the top of said hood;

and means mounted on said air cleaner for drawing shop air from said working volume through said air cleaner and thereafter returning said air to the shop.

* * * * *